United States Patent
Berstis et al.

(10) Patent No.: US 8,086,999 B2
(45) Date of Patent: *Dec. 27, 2011

(54) AUTOMATIC NATURAL LANGUAGE TRANSLATION DURING INFORMATION TRANSFER

(75) Inventors: Viktors Berstis, Austin, TX (US);
Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 12/245,279

(22) Filed: Oct. 3, 2008

(65) Prior Publication Data
US 2009/0031238 A1    Jan. 29, 2009

Related U.S. Application Data

(63) Continuation of application No. 10/755,832, filed on Jan. 12, 2004, now Pat. No. 7,475,390.

(51) Int. Cl.
*G06F 9/44* (2006.01)
(52) U.S. Cl. ......... 717/110; 717/103; 715/724; 715/770
(58) Field of Classification Search ................... 717/103; 715/727, 770
See application file for complete search history.

(56) References Cited

U.S. PATENT DOCUMENTS

| | | | |
|---|---|---|---|
| 4,688,033 A | 8/1987 | Carini et al. | |
| 4,890,247 A | 12/1989 | Sarrine et al. | |
| 5,097,418 A | 3/1992 | Nurse et al. | |
| 5,283,856 A | 2/1994 | Gross et al. | |
| 5,367,623 A | 11/1994 | Iwai et al. | |
| 5,426,583 A | 6/1995 | Mendibil | |
| 5,440,678 A | 8/1995 | Eisen et al. | |
| 5,544,300 A | 8/1996 | Skarbo et al. | |
| 5,579,521 A | 11/1996 | Stearer et al. | |
| 5,583,761 A | 12/1996 | Chou | |
| 5,586,025 A | 12/1996 | Tsuji et al. | |
| 5,590,266 A | 12/1996 | Carson et al. | |

(Continued)

FOREIGN PATENT DOCUMENTS

JP      2001250005      9/2001

(Continued)

OTHER PUBLICATIONS

Miller et al. "Synchronizing Clipboards of Multiple Computers" ACM, 1999, vol. 1.1, pp. 65-66.*

(Continued)

*Primary Examiner* — Wei Y Zhen
*Assistant Examiner* — Phillip H Nguyen
(74) *Attorney, Agent, or Firm* — Robert H. Frantz; Mark C. Vallone; David A. Mims, Jr.

(57) ABSTRACT

Information elements are automatically translated during cutting-and-pasting in a destination first, source second sequence by receiving a user selection of insertion points in the contents of a destination computer resource, then receiving a user selection of one or more information elements, intercepting transfer of the information elements to the destination computer resource, determining which intercepted information elements are expressed in a natural language not matching a user-specified natural language, performing one or more natural language handling actions on the intercepted information elements which do not match the user specified natural language as defined by one or more natural language handling rules, and transferring translated information elements to the destination.

9 Claims, 7 Drawing Sheets

U.S. PATENT DOCUMENTS

| | | | |
|---|---|---|---|
| 5,614,703 | A | 3/1997 | Martin et al. |
| 5,666,552 | A | 9/1997 | Greyson et al. |
| 5,678,039 | A | 10/1997 | Hinks et al. |
| 5,706,458 | A | 1/1998 | Koppolu |
| 5,765,156 | A | 6/1998 | Guzak et al. |
| 5,781,192 | A | 7/1998 | Kodimer |
| 5,801,693 | A | 9/1998 | Bailey |
| 5,864,830 | A | 1/1999 | Armetta et al. |
| 5,897,643 | A | 4/1999 | Matsumoto |
| 5,897,650 | A | 4/1999 | Nakajima et al. |
| 5,924,099 | A | 7/1999 | Guzak et al. |
| 5,929,854 | A | 7/1999 | Ross |
| 5,956,736 | A | 9/1999 | Hanson et al. |
| 5,964,834 | A | 10/1999 | Crutcher |
| 5,974,372 | A | 10/1999 | Barnes et al. |
| 5,995,103 | A | 11/1999 | Ashe |
| 6,023,679 | A | 2/2000 | Acebo et al. |
| 6,032,134 | A | 2/2000 | Weissman |
| 6,044,135 | A | 3/2000 | Katz |
| 6,070,244 | A | 5/2000 | Orchier et al. |
| 6,108,668 | A | 8/2000 | Bates et al. |
| 6,177,939 | B1 | 1/2001 | Blish et al. |
| 6,192,378 | B1 | 2/2001 | Abrams |
| 6,195,420 | B1 | 2/2001 | Tognazzini |
| 6,212,577 | B1 | 4/2001 | Stern et al. |
| 6,236,955 | B1 | 5/2001 | Summers |
| 6,240,430 | B1 | 5/2001 | Deike et al. |
| 6,266,683 | B1 | 7/2001 | Yehuda et al. |
| 6,268,852 | B1 | 7/2001 | Lindhorst et al. |
| 6,272,505 | B1 | 8/2001 | De Le Huerga |
| 6,289,330 | B1 | 9/2001 | Jannarone |
| 6,309,305 | B1 | 10/2001 | Kraft |
| 6,313,855 | B1 | 11/2001 | Shuping et al. |
| 6,324,498 | B1 | 11/2001 | Wajda |
| 6,360,205 | B1 | 3/2002 | Iyengar et al. |
| 6,381,567 | B1 | 4/2002 | Christensen et al. |
| 6,401,118 | B1 | 6/2002 | Thomas |
| 6,449,616 | B1 | 9/2002 | Walker et al. |
| 6,453,268 | B1 | 9/2002 | Carney et al. |
| 6,477,503 | B1 | 11/2002 | Mankes |
| 6,496,841 | B1 | 12/2002 | Tognazzini |
| 6,519,631 | B1 | 2/2003 | Rosenschein et al. |
| 6,560,608 | B1 | 5/2003 | Tomm et al. |
| 6,567,973 | B1 | 5/2003 | Yamamoto et al. |
| 6,587,837 | B1 | 7/2003 | Spagna et al. |
| 6,591,094 | B1 | 7/2003 | Bentley et al. |
| 6,735,701 | B1 | 5/2004 | Jacobson |
| 6,773,266 | B1 | 8/2004 | Dornbush et al. |
| 6,789,252 | B1 | 9/2004 | Burke et al. |
| 6,807,668 | B2 | 10/2004 | Stern et al. |
| 6,873,957 | B1 | 3/2005 | Chen et al. |
| 6,891,551 | B2 | 5/2005 | Keely et al. |
| 6,901,367 | B1 | 5/2005 | Berstis et al. |
| 6,993,473 | B2 | 1/2006 | Cartus |
| 7,036,092 | B2 | 4/2006 | Sloo et al. |
| 7,107,206 | B1 | 9/2006 | Uchida et al. |
| 7,167,904 | B1 | 1/2007 | Devarajan et al. |
| 7,171,468 | B2 | 1/2007 | Yeung et al. |
| 7,185,274 | B1 | 2/2007 | Rubin et al. |
| 7,293,242 | B2 | 11/2007 | Cossey et al. |
| 7,310,781 | B2 | 12/2007 | Chen et al. |
| 7,328,166 | B1 | 2/2008 | Geoghegan et al. |
| 7,340,685 | B2 | 3/2008 | Chen et al. |
| 7,346,853 | B2 | 3/2008 | Chen |
| 7,475,390 | B2 | 1/2009 | Berstis |
| 7,478,336 | B2 | 1/2009 | Chen et al. |
| 7,496,230 | B2 | 2/2009 | Chen et al. |
| 7,503,012 | B2 | 3/2009 | Chen et al. |
| 2001/0016825 | A1 | 8/2001 | Pugliese, III et al. |
| 2001/0049613 | A1 | 12/2001 | Gramann, III et al. |
| 2002/0002452 | A1* | 1/2002 | Christy et al. .......... 704/3 |
| 2002/0052893 | A1 | 5/2002 | Grobler et al. |
| 2002/0054092 | A1 | 5/2002 | Hedloy |
| 2002/0082877 | A1 | 6/2002 | Schiff et al. |
| 2002/0156672 | A1 | 10/2002 | Burko |
| 2002/0165862 | A1 | 11/2002 | Richards et al. |
| 2002/0186255 | A1 | 12/2002 | Shafron et al. |
| 2002/0188670 | A1* | 12/2002 | Stringham .......... 709/203 |
| 2003/0004760 | A1 | 1/2003 | Schiff et al. |
| 2003/0007007 | A1 | 1/2003 | Hinegardner et al. |
| 2003/0036929 | A1 | 2/2003 | Vaughan et al. |
| 2003/0040900 | A1 | 2/2003 | D'Agostini |
| 2003/0061145 | A1 | 3/2003 | Norrid |
| 2003/0125927 | A1* | 7/2003 | Seme .......... 704/3 |
| 2003/0135476 | A1 | 7/2003 | Holland et al. |
| 2003/0200078 | A1 | 10/2003 | Luo et al. |
| 2004/0027382 | A1 | 2/2004 | Kuehn et al. |
| 2004/0039995 | A1 | 2/2004 | Kuwata et al. |
| 2004/0150215 | A1 | 8/2004 | King |
| 2004/0181753 | A1 | 9/2004 | Michaelides |
| 2004/0205493 | A1 | 10/2004 | Simpson et al. |
| 2004/0250215 | A1 | 12/2004 | Chen |
| 2004/0257346 | A1 | 12/2004 | Ong et al. |
| 2004/0260535 | A1 | 12/2004 | Chen et al. |
| 2004/0267823 | A1 | 12/2004 | Shapiro et al. |
| 2005/0091603 | A1 | 4/2005 | Chen et al. |
| 2005/0102629 | A1 | 5/2005 | Chen et al. |
| 2005/0102630 | A1 | 5/2005 | Chen et al. |
| 2005/0132280 | A1 | 6/2005 | Broman et al. |
| 2005/0154992 | A1 | 7/2005 | Chen et al. |
| 2005/0154993 | A1 | 7/2005 | Chen et al. |
| 2005/0154994 | A1 | 7/2005 | Chen et al. |
| 2005/0155017 | A1 | 7/2005 | Berstis et al. |
| 2006/0224903 | A1 | 10/2006 | Ginter et al. |
| 2006/0253330 | A1 | 11/2006 | Maggio et al. |
| 2006/0282319 | A1 | 12/2006 | Maggio et al. |
| 2008/0072144 | A1 | 3/2008 | Chen et al. |
| 2008/0098317 | A1 | 4/2008 | Chen et al. |
| 2008/0300859 | A1 | 12/2008 | Chen et al. |
| 2009/0030672 | A1 | 1/2009 | Berstis et al. |
| 2009/0031238 | A1 | 1/2009 | Berstis et al. |
| 2009/0044140 | A1 | 2/2009 | Chen et al. |

FOREIGN PATENT DOCUMENTS

| | | |
|---|---|---|
| WO | 2002/02071259 | 9/2002 |
| WO | WO 02071259 | 9/2002 |

OTHER PUBLICATIONS

Akers "LogMedia Translate, Version 2.0", 2002, pp. 220-223.*

Apperley, Mark, et al.; "Breaking the copy/paste cycle: the stretchable selection tool", published: 2000, downloaded from USPTO Private PAIR in U.S. Appl. No. 10/692,173, on Apr. 16, 2009.

Courter, et al. Mastering Microsoft Office 2000 Professional Edition, (c) 1999, SYBEX, pp. 35, 37.

IBM, Technical Disclosure Bulletin "Multiple Item On-line Clipboard", Jul. 1992, p. 425.

Microsoft Corp., "OLE Concepts and Requirements Overview", three pages, Nov. 3, 2003.

TechSmith Corp, SnagIT User's Guide, 2002.

University of Kentucky, WS.sub—FTP Quick Reference Guide, Apr. 3, 2000, http://www.uky.edu/SCS/documents/Win-wsftp-win-wsftppf.html.

"Synchronizing Clipboards of Multiple Computers" by Robert C. Miller and Brad A. Myers School of Computer Science Carnegie Mellon University, Copyright 1999.

"PROject MT Ltd.—UDDI Business (Provider) Details" downloaded from http://www.bindingpoint.com/on Nov. 4, 2003.

Clipboard Magic, v4.1 by Cyber-Matrix, http://www.filebuzz.com/fileinfo/317/Clipboard.sub.—Magic.html, Fig. 1. 2005.

Clipboard Magic, v4.1 by Cyber-Matrix, Jul. 4, 2005, http://www.filebuzz.com/fileinfo/317/Clipboard.sub.—Magic.html, Fig. 1.

File Buzz, "Clipboard Magic v4.01", retrieved on Apr. 7, 2008 from http://www.filebuzz.com/fileinfo/317/Clipboard.sub.—Magic.html, 2 pages.

Cybermatrix, "Clipboard Magic [TM]: Free Multiple Storage Clipboard Utility", Version 4.01, retrieved on Apr. 7, 2008 from http://www.cybermatrix.com/clipboard.sub.—magic.html, 3 pages (please note "version history" link in Product Quick Links box, upper right portion of first page).

Cybermatrix, "Clipboard Magic Version History", retrieve on Apr. 7, 2008 from http://www.cybermatrix.com/changes/cmagic.html, 6 pages (please note v4.01 release date of Nov. 22, 2005 at top of first page).

"Citation Style for Research Papers" by Long Island University, downloaded on Nov. 6, 2003 from http://www.liu.edu/cwis/cwp/library/workshop.

"Turabian Citation Style" by Long Island University, downloaded on Nov. 6, 2003 from http://www.liu.edu/cwis/cwp/library/workshop.

"MLA Citation Style" by Long Island University, downloaded on Nov. 6, 2003 from http://www.liu.edu/cwis/cwp/library/workshop.

"Chicago Citation Style" by Long Island University, downloaded on Nov. 6, 2003 from http://www.liu.edu/cwis/cwp/library/workshop.

"AMACitation Style" by Long Island University, downloaded on Nov. 6, 2003 from http://www.liu/edu/cwis/cwpllibrary/workshop.

"APA Citation Style" by Long Island University, downloaded on Nov. 6, 2003 from http://www.liu.edu/cwis/cwp/library/workshop.

Screen shot from "AltaVista's Babel Fish Translation Service", performed from http://babelfish.altavista.com/babelfish on Oct. 30, 2003.

"Lingua Translator Web Service—XML Web Service Details" downloaded from http://www.bindingpoint.com/ on Nov. 4, 2003.

John Kaufeld, Access 97 for Windows for Dummies, Copyright (c) 1996, IDG Books Worldwide, Inc. pp. 24, 68, 77, 82, 89, 299, 300.

USPTO; recent examination correspondence in related U.S. Appl. No. 12/245,403, filed on Oct. 3, 2008, byt Viktors Berstis.

USPTO; Notice of Allowance, U.S. Appl. No. 11/961,813; filed on Dec. 20, 2007 by Yen-Fu Chen.

USPTO; Examination Correspondence from a Related U.S. Appl. No. 12/192,391; filed on Aug. 15, 2011 by Yen-Fu Chen.

* cited by examiner

AUTOMATIC NATURAL LANGUAGE TRANSLATION DURING INFORMATION TRANSFER

CROSS-REFERENCE TO RELATED APPLICATIONS (CLAIMING BENEFIT UNDER 35 U.S.C. 120)

This application is a continuation of U.S. application Ser. No. 10/755,832, filed on Jan. 12, 2004 now U.S. Pat. No. 7,474,390, now under allowance, which was related to U.S. patent application Ser. No. 10/455,159, filed on Jun. 5, 2003, now U.S. Pat. No. 7,310,781, and to U.S. patent application Ser. No. 10/692,173, filed on Oct. 23, 2003, currently pending, all of which were filed by Yen-Fu Chen, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related patent applications and issued patent are incorporated by reference to the present disclosure, including figures:
(a) U.S. application Ser. No. 10/755,832, filed on Jan. 12, 2004;
(b) U.S. patent application Ser. No. 10/455,159, filed on Jun. 5, 2003, now U.S. Pat. No. 7,310,781; and
(c) U.S. patent application Ser. No. 10/692,173, filed on Oct. 23, 2003.

BACKGROUND OF THE INVENTION

1. Field of the Invention

This application is a continuation of U.S. application Ser. No. 10/755,832, filed on Jan. 12, 2004, now under allowance, which was related to U.S. patent application Ser. No. 10/455, 159, filed on Jun. 5, 2003, now U.S. Pat. No. 7,310,781, and to U.S. patent application Ser. No. 10/692,173, filed on Oct. 23, 2003, currently pending, all of which were filed by Yen-Fu Chen, et al. This invention relates to methods for transferring information from one computer resource to another during which the information is translated from an initial natural or native language to a selected destination language.

2. Background of the Invention

Modern multi-tasking computers provide a variety of user interfaces for controlling multiple application programs and system functions which operate simultaneously. Some of the most widely used multi-tasking computer systems are personal computers ("PC") running a multi-tasking operating system ("OS") such as International Business Machines' ("IBM") OS/2 ™ or AIX™, Microsoft Windows™, and Apple Computer's MacOS™. Other operating systems may be used with personal computers as well as larger computers such as enterprise-class computers, such as UNIX, Sun Microsystems' Solaris™, Hewlett Packard's HP-UX™, and the "open sourced" LINUX. Smaller computing platforms such as held-held computers, personal digital assistants ("PDA"), and advanced wireless telephones may run operating systems targeted for such hardware including Palm Computing's PalmOS™ and Microsoft's Windows CE™. Additionally, there are many "proprietary" and less widely-used computing platforms and operating systems which also allow users to control and run multiple programs and system functions simultaneously.

Many of these systems will use tabs, icons, windows, frames, pages and special key combinations to allow a user to switch between user interfaces ("UI") for each program and system function which is being executed, or to start or stop the execution of a program or system function. For example, in a personal computer running MS Windows™, the user may first start a web browser program running using several methods (e.g. double clicking an icon on the desktop, selecting the program from a Start Programs list, operating a "hot key", etc.), and then may start a document editor program using similar methods. Each program establishes a user interface such as its own "window". The user can then control a program by selecting its window using one of several available methods, such as selecting a button or icon on a command bar, activating a "task list" and selecting a program, etc. As a result, a user can start and run many programs simultaneously, periodically switching between their user interfaces to accomplish work or entertainment tasks as needed. Other computing systems provide similar basic user control capabilities, albeit with a variety of user controls to switch between programs and system functions.

Users often wish to copy or transfer information or "content" from one program or system function to another. For example, a user may be preparing an invoice for a client using a word processor program, but may also be simultaneously using a database or spreadsheet program to perform various calculations. Using "copy and paste" functions of the application programs and the operating system, the user may select information from a source program (e.g. the spreadsheet), and "paste" it into the destination program (e.g. the invoice being edited). Such a process is so common place in computer users' daily lives that it is rote, albeit each user may know several sequences of actions for several computers which he or she commonly uses (e.g. one process on his home PC, another on his PDA, and another on his networked terminal at work). These memorized methods may typically include several steps of clicking on icons, dropping down lists, highlighting information, and using navigation controls within program UI's.

For example, turning to FIG. 1, a "windows" style user interface is depicted to illustrate a process of "copying" information from a web browser program to a word processor file via a "clipboard" memory. In this system, each program provides a window (2, 3, 104) which can be closed (9, 9') to end the program, maximized (8, 8') to view the full UI for that program, or minimized (7, 7') to leave the program running but deactivate the UI (e.g. clear the UI window from the screen). In this example, these controls are located in a command bar (4, 4') along the top of the UI window, but many other variations are known in the art.

Each UI window also typically has navigation controls such as left panning (15, 15'), right panning (13, 13'), and horizontal scroll (14, 14') controls, as well as up panning (10, 10'), down panning (12, 12'), and vertical scroll (11, 11'), for viewing areas of information and content not completely viewable in the UI. Information, icons, text, graphics, etc., are shown or displayed within (16, 18) the UI window according to the scroll and panning control settings. More recently, the term "content" (16, 18) has been used to collectively refer to all types of information which may be displayed or presented in a user interface, including but not limited to text, graphics, still images, animated images, video, audio, and hyperlinks.

Now suppose for the purpose of our example, the user has started a word processing program which provides a first UI window (2), and a web browser which provides a second UI window (3). Also suppose that the user is researching information on the Internet using the web browser while authoring a paper which is being edited simultaneously using the word processor.

In this example, the user has found information (19) at a hypothetical web address (17) that he wants to "quote" in his or her paper. So, the user must first move the cursor (104) in the word processor to select an insertion point for the information, then must switch to the web browser UI, select the text (19) in the source content, operate a "copy" command in the web browser UI which copies (101) the content into a buffer (100) such as a "clipboard", switch back to the word processor UI, and operate a "paste" or "insert" command, which results in the copied content (19) being inserted into the destination document at the point of insertion (103). The user can repeat this process for many different program UI's (106).

In some software and hardware configurations, the copy buffer may be provided within a suite of application programs which are "tightly coupled" or related. Such suites cooperate with each other in ways not possible with software programs provided by differing suppliers. In many cases, however, the operating system provides a buffer function which is generally accessible by all programs, such as the clipboard in the MS Windows™ operating system.

Also, in some situations, the original content with its original format may not be acceptable by the destination program, and as such, a specialized paste or insertion function (105) may be provided by the destination program or operating system which converts the content to a form useful by the destination program. For example, text copied from a web page may include color, size, font, style, and hyperlink reference information embedded in the base Hyper Text Markup Language ("HTML") of the source web page. However, not all word processors are able to interpret all of these special codes and identifiers, so a "paste as plain text" option may be provided by a converter or translator (105) function.

So, to illustrate the complexity and tedious nature of such ordinary operations, we present the steps in full to accomplish this example scenario of simply transferring a block of formatted text from a web page to a word processor program, starting from a point where the user is editing the destination document in the word processor:

(a) navigate to the insertion point in the destination document using the word processor UI window controls (e.g. multiple clicks on scroll, panning or page up/page down keys);

(b) optionally select text or content in the destination document which is to be replaced;

(c) switch to the web browser UI window (e.g. click on an icon in a task bar, activate a task list and pick a running web browser program, etc.);

(d) navigate in the web browser UI window to find the text or content desired to be transferred into the document (e.g. use panning, scrolling, or page up/page down keys);

(e) select the source content or text (e.g. click-and-drag over the content to highlight it)

(f) transfer the content to a copy buffer (e.g. click on "Edit" command, select "copy" option or type Alt-E, Alt-C);

(g) switch back to the word processor UI window (e.g. (e.g. click on a icon in a task bar, activate a task list and pick a running web browser program, etc.); and (h) operate a "paste" command in the word processor UI window (e.g. click on "Edit" command, select "paste" option or type Alt-E, Alt-P).

Each of these operations may actually require several steps (clicking, scrolling, selecting, typing, etc.), so this minimal process may represent 7 to 25 actual user actions. This process must be repeated for each block of text or content to be transferred from multiple program UI windows (106), and additional steps may be necessary to achieve a "special paste", as described above. Also, if the same text or content is to be inserted into the destination document for file at multiple locations, the last few operations of this process (h) in addition to some navigation actions must by performed by the user.

As a result, consolidating information from multiple sources of information may be extremely tedious, frustrating, and tiresome using the currently available methods and apparatuses provided in such computing systems. Some systems may provide notably more "user friendly" or intuitive methods, while other systems are much more difficult and "clunky" to use.

Turning to FIG. 2, this process is generalized. Starting at a point or time (21) when the user is actively working with the destination program UI, the user must navigate (22) within the present document, file, or other computer resource to a point where the content insertion is to be made, including selecting any content which is to be replaced. Then, the user must switch (23) to the UI of the first source of information, navigate (24) to the first source content to be transferred, select that content, and operate (25) a copy or cut control in the first source UI.

Next, the user must switch (26) back to the destination UI, and operate (27) an insert or paste command in that UI. If (28) the user wants to insert or paste that content into multiple destinations, the user must navigate (29) to each destination and operate (27) the paste or insert command in the destination program UI, until all insertions have been made for that source information.

If (200) the user desires to transfer information from other points in the same source, or from other sources, the user must repeatedly switch (201) to a source UI, navigate to a source content point, select source information, operate (25) a copy or cut operation, switch (26) back to the destination UI, and paste or insert (27) the content, until all information has been transferred.

Implied, but not shown in detail, in this generalization of the process can be multiple user actions for each general step. Optionally, options such as conversion of the content may be necessary, which requires additional user actions (e.g. the "paste as plain text" example).

So, it is possible that in the course of authoring a paper using a word processor and information from several sources, the user may have to perform hundreds of tedious actions, commands, selections, navigation operations, etc.

In this paradigm, certain conventions have evolved into place which only moderately simplify or reduce the burden of such operations. For example, performing a "cut" operation usually deletes the selected source content from the source file, and places a copy of it into the transfer buffer, sometimes overwriting the current contents of the transfer buffer. A "copy" operation typically leaves the selected information unchanged in the source and only places a copy of the information in the transfer buffer. Additionally, in the destination UI, a "paste" or "insert" command may copy the contents of transfer buffer to a selected point in the destination document or file, leaving a copy in the transfer buffer for additional pastes or insertions.

In some programs, a "paste special", "import from clipboard", or similar command may be available with several conversion options to perform a minimal conversion process on each transfer. However, even though the user may be performing the same "paste special" command over and over, the typical UI does not memorize or "learn" this process, so the user is forced to respond to a number of redundant options and dialogs on each paste operation.

The same user interface conventions are followed by many computer systems not only for content or information within a computer resource such as text and graphics within a file, but also for resources (e.g. files, shortcuts, icons, mappings, etc.) within a computing environment (e.g. file system, directories, folders, etc.). For example, when working with a MS Windows™ operating system and running the Windows Explorer program, a user may select a file, directory or folder to move, execute an "Edit—Cut" command sequence, navigate to another directory or drive, and execute an "Edit—Paste" command to move the selected resource to the new destination. Similarly, by selecting the source resource, executing a copy command, and then executing a paste command to one or more destinations, the original resource is not changed but copies of it are deposited at the destination points. Further, by selecting and copying a source resource, then selecting a destination resource, replacement of the destination resource may be accomplished.

However, as source information may or may not be completely compatible with destination environment, the user, even when using the related invention, may be required to make certain tedious and inconvenient operations to perform the information transfer usefully.

For example, consider a situation where the source information is a graphically rich section of a web page, including text and color photographs. Further assume for the purposes of this example that the color photographs are stored in the source document as Joint Photographic Experts Group ("JPEG") format data objects. If the user attempts to transfer this selected information (e.g. text+photograph) to a destination which does not support JPEG photographs, such as a text-only editor, a problem may arise that cannot be completely handled by the related invention—e.g. what to do with the photograph. In some other cases, destination editor may be able to handle other format images, such as Graphic Interface File ("GIF") images, but not JPEG images.

The user may, after realizing this and with sufficient technical expertise, find a way to export the image and save it to a separate file, use another tool to convert the JPEG image to a GIF image, and then use the related invention to transfer the GIF image to the destination document. This process, however, requires the user to have the expertise necessary to make such an export and conversion, as well as to have the extra tool to perform the conversion. Further, if this is a task to be repeated often, such as cutting and pasting a considerable amount of information in this manner, it becomes tedious, tiresome, and error-prone.

Additionally, in some situations, it is desirable to translate the initial spoken language of the source to another spoken language. For example, if a user is creating a Spanish-language newspaper and desires to quote an source which is provided in English, the present day systems require the user to perform all of the cut-and-paste steps as just described, as well as to some how perform a language translation on the English source text. The translation can be performed manually, or the user may have to retype the English text into a translation program, select an option to translate the text to Spanish, and then retype or cut-and-paste the Spanish text into the desired destination file or document. To achieve a computer-assisted translation such as this, the user may use one of many well-known programs or online services, such as AltaVista's online BabelFish™ phrase translator. However, to use these existing tools, the user must treat the translation program (or web site) as yet another source and/or destination, and must perform many user operations to effect cutting and pasting from source to translator, and from translator to destination. If the user is translating several phrases several sources, and inserting the translated text into a plurality of destination points, this process can be very cumbersome and tedious.

Therefore, there is a need in the art for a system and method to provide configurable automatic source-to-destination spoken language translation for transferring information from one or more source environments in one or more initial spoken language to one or more destination environments in a selected spoken language.

SUMMARY OF THE INVENTION

The present invention allows computer information elements such as text, tables, graphics, and hyperlinks, to be intercepted during their transfer from a computer source to a computer destination, such as during a cut-and-paste operation. It is determined if each intercepted information element is expressed in a natural language (e.g. spoken or written language such as English, Japanese, Spanish, Farsi, etc.) which matches a user-specified natural language intended for the destination.

For intercepted information elements which do not match the user-specified natural language for the destination, one or more natural language handling actions such as translation or isolation of the information elements are automatically performed in order to translate the elements to the desired destination language. Translated information elements and elements which were originally in the desired destination language are delivered to the destination, and isolated elements are placed in a data store for later review and/or exchange with other elements.

BRIEF DESCRIPTION OF THE DRAWINGS

The following detailed description when taken in conjunction with the figures presented herein provide a complete disclosure of the invention.

DESCRIPTION OF THE INVENTION

Figure 1:
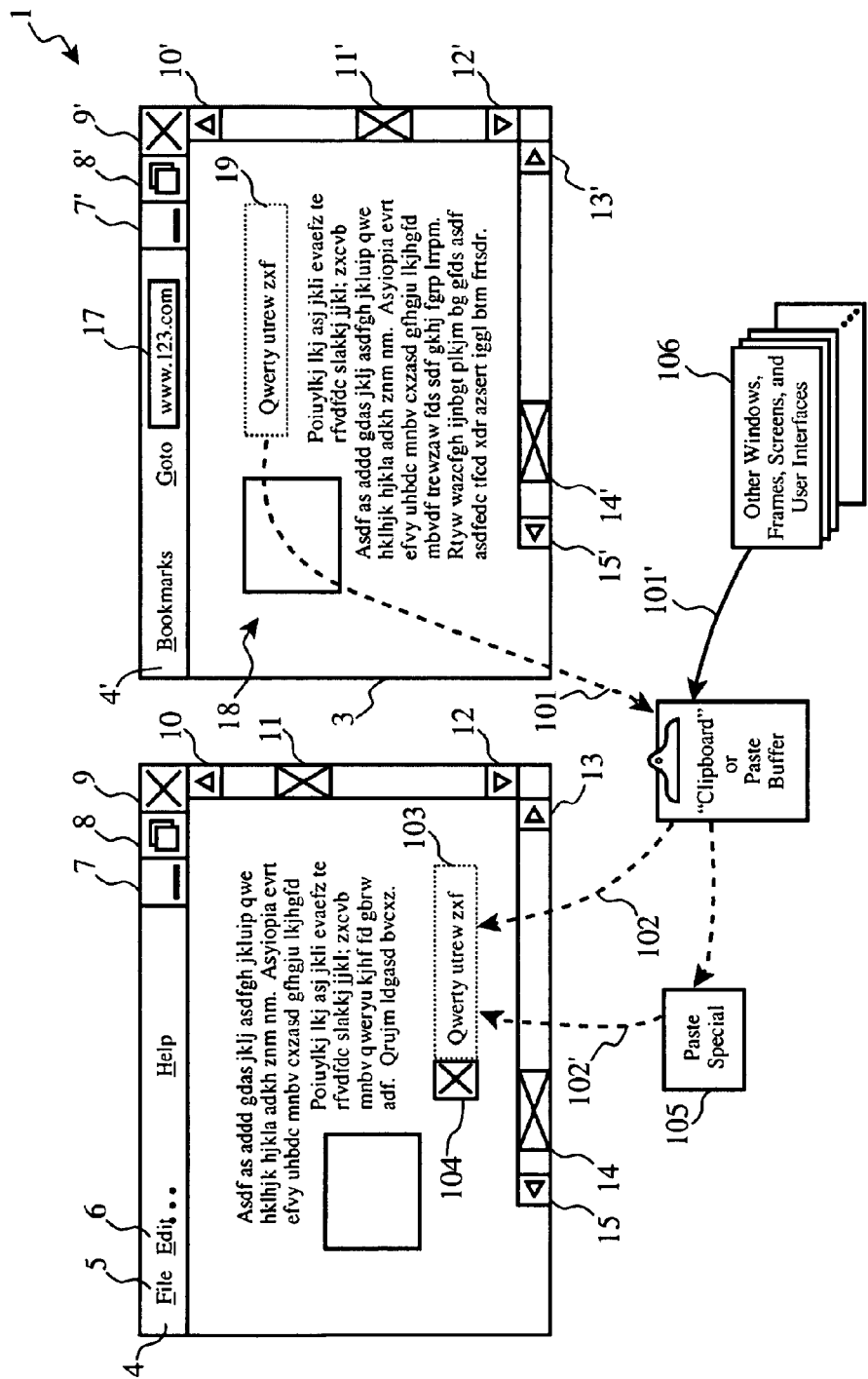
FIG. 1 illustrates the typical user interfaces and system actions of "cutting and pasting" information from one application program to another.
Figure 2:
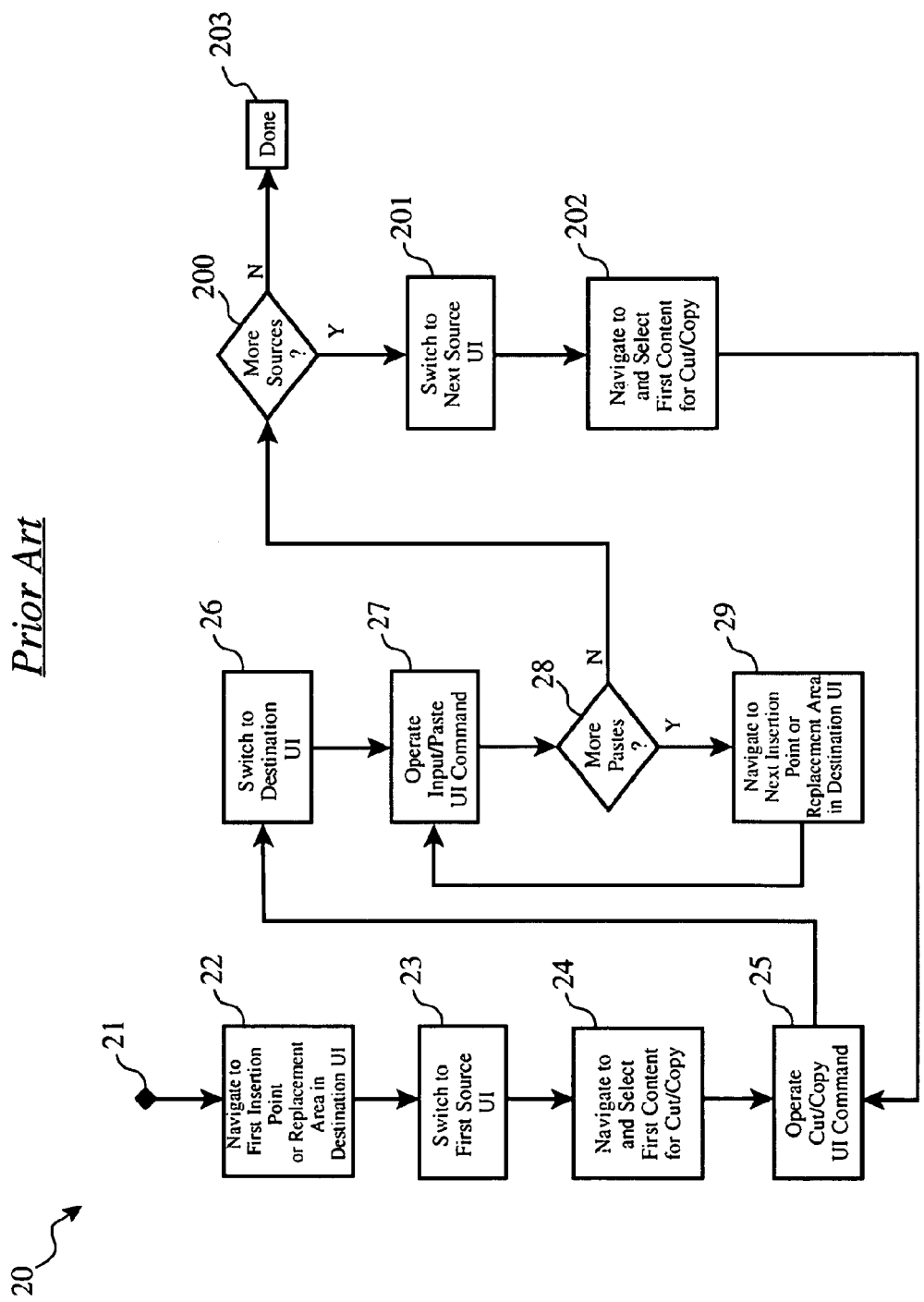
FIG. 2 shows the typical logical process in a general manner for transferring content from one application program or system function to another.

The present invention is preferably realized in conjunction with either or both of the systems and methods described in the related patent applications which are entitled "System and Method for Content and Information Transfer Between Program Entities" and "System and Method for Automatic Information Compatibility Detection and Pasting Intervention", both of which were filed by Yen-Fu Chen, et al. The former application provides an improved method for cutting and pasting information from multiple sources into a destination file, while the latter provides an improvement in which content is automatically converted to a digital format which is compatible with the destination file or computer resource. It will be recognized by those skilled in the art, however, that the present invention may alternately be realized independently of these related inventions, or in conjunction with other technologies and products.

Throughout the present disclosure, we will utilize the terms "spoken language" and NLS synonymously. The acronym NLS has varying representation based upon the defining source, but generally relates to spoken and written human-readable language. For example, some sources define NLS as "natural language system", such as a voice recognition system which recognizes free speech phrases. IBM and Microsoft define the acronym NLS as "national language support", which encompasses an array of computing system options to adapt the system to geographically local spoken languages, including such options as selection of a default character set, keyboard layout, etc. As such, we will utilize the acronym NLS to indicate a human-spoken or human-written language (e.g. English, Spanish, Japanese, Farsi, etc.), as opposed to a binary or computer-related language or format (e.g. not "C", Java, JPEG, HTML, etc.). Further, throughout our disclosure, we will refer to conversion of information from one spoken language to another spoken language as "translation".

SUMMARY OF THE RELATED INVENTIONS

According to one aspect of the first related invention, the user initially designates one or more insertion points or replacement areas for receiving transferred content in a destination UI, then switches to a source UI, highlights content to be transferred, and the system performs the copy or paste operation without any additional user action, including any conversion as may be necessary.

Then, the user may simply navigate to another point in the same source, or switch to another source UI, select content, and it will be "pasted" automatically into the destination without the user having to switch back to the destination UI or perform any additional paste or insert command actions.

According to an aspect of the second related invention, users are enabled to preselect or pre-designate one or more destination content area(s) or points, and then to only perform the highlighting action in the source files or documents to produce copy/paste results without any additional mouse clicks or touching the keyboard. Additionally, the second related invention automatically intercepts the transfer of the information to the destination, detects information digital compatibility during information transfer (e.g. during a "pasting from buffer" operation"), determining if the information is compatible with the destination document, environment, or data construct. If the information is not compatible, the transfer is suspended, and the user is provided an opportunity to define a new rule, process, or macro regarding how to handle the incompatible information. Options include invoking a converter or translator, if one is available on the present system. Another option is to export the incompatible information to a separate data construct such as a separate file, and to provide a note or annotation in the destination file as to the removal of the information and its final location.

Suitable Computing Platforms

The present invention is preferably realized as computer-executable code such as compiled software, scripts, or portable programs, in conjunction with existing application programs, operating systems, and computer hardware. For purposes of completeness, we first present a generalized view in FIGS. 3 and 4 of typical computer hardware and software which is suitable for realization of our invention. Many variations of these computer platform details may be made without departing from the scope of the invention, as will be readily recognized by those skilled in the art.

Common computing platforms such as personal computers, web servers, and web browsers, as well as proprietary computing platforms, may be used in realization of the present invention. These common computing platforms can include, but are not limited to, personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 3:
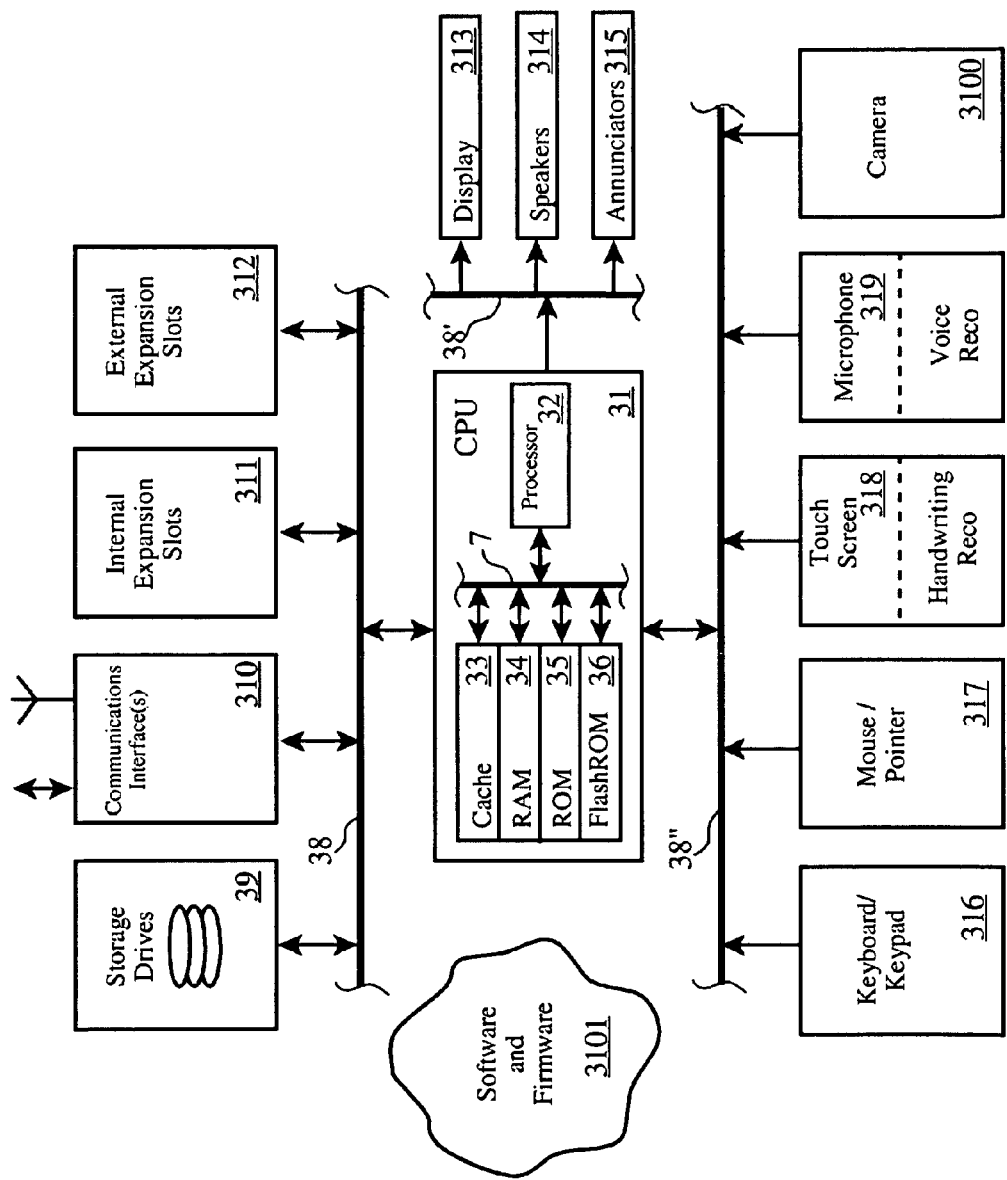
FIG. 3 depicts a generalized computing platform architecture, such as a personal computer, server computer, personal digital assistant, web-enabled wireless telephone, or other processor-based device.

Turning to FIG. 3, a generalized architecture is presented including a central processing unit (31) ("CPU"), which is typically comprised of a microprocessor (32) associated with random access memory ("RAM") (34) and read-only memory ("ROM") (35). Often, the CPU (31) is also provided with cache memory (33) and programmable FlashROM (36). The interface (37) between the microprocessor (32) and the various types of CPU memory is often referred to as a "local bus", but also may be a more generic or industry standard bus. Many computing platforms are also provided with one or more storage drives (39), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (310), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (311), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (312) allowing the user the ability to easily install and remove hardware expansion devices, such as PCMCIA cards, SmartMedia cards, and various proprietary modules such as removable hard drives, CD drives, and floppy drives.

Often, the storage drives (39), communication interfaces (310), internal expansion slots (311) and external expansion slots (312) are interconnected with the CPU (31) via a standard or industry open bus architecture (38), such as ISA, EISA, or PCI. In many cases, the bus (38) may be of a proprietary design.

A computing platform is usually provided with one or more user input devices, such as a keyboard or a keypad (316), and mouse or pointer device (317), and/or a touch-screen display (318). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (318) is usually provided, often with handwriting recognition capabilities.

Additionally, a microphone (319), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (3100), such as a still digital camera or full motion video digital camera.

One or more user output devices, such as a display (313), are also provided with most computing platforms. The display (313) may take many forms, including a Cathode Ray Tube ("CRT"), a Thin Flat Transistor ("TFT") array, or a simple set of light emitting diodes ("LED") or liquid crystal display ("LCD") indicators.

One or more speakers (314) and/or annunciators (315) are often associated with computing platforms, too. The speakers (314) may be used to reproduce audio and music, such as the speaker of a wireless telephone or the speakers of a personal computer. Annunciators (315) may take the form of simple beep emitters or buzzers, commonly found on certain devices such as PDAs and PIMs.

These user input and output devices may be directly interconnected (38', 38") to the CPU (31) via a proprietary bus structure and/or interfaces, or they may be interconnected through one or more industry open buses such as ISA, EISA, PCI, etc.

The computing platform is also provided with one or more software and firmware (3101) programs to implement the desired functionality of the computing platforms.

Figure 4:
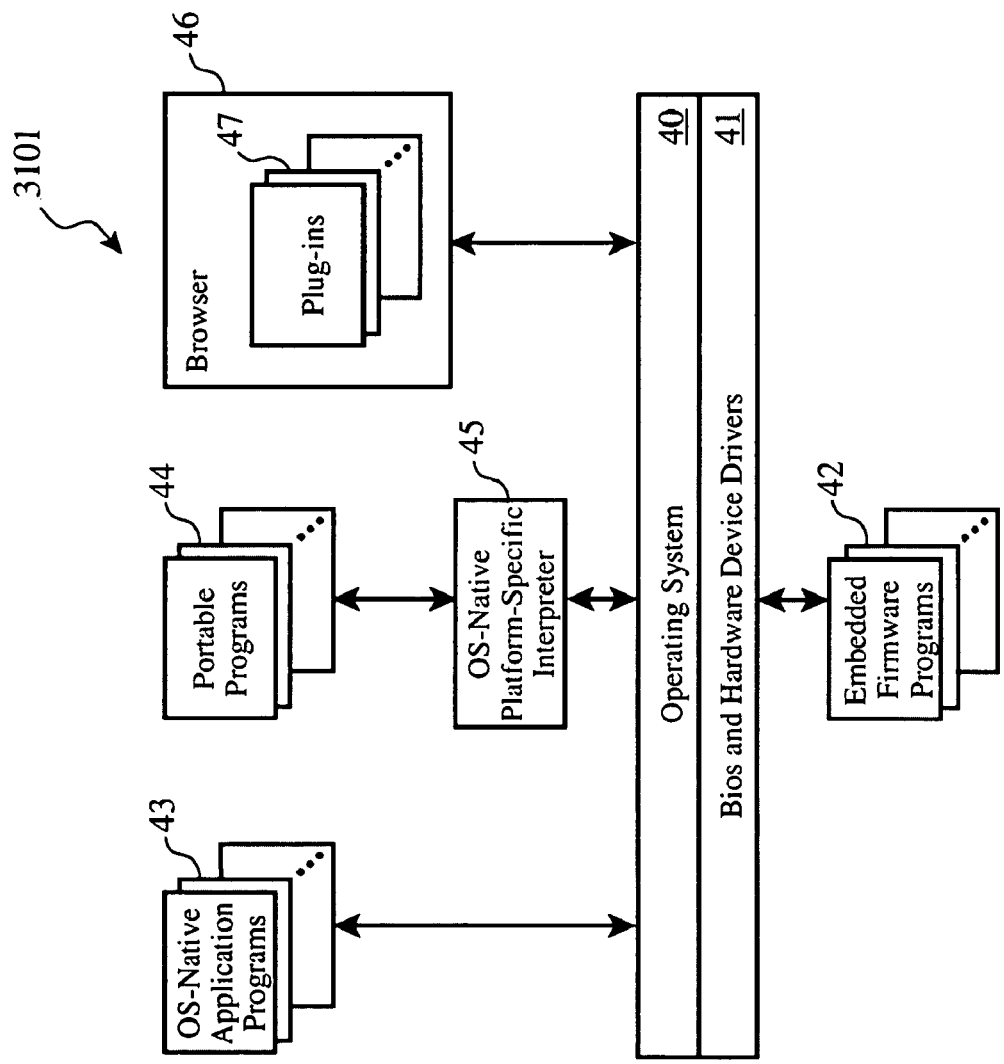
FIG. 4 shows a generalized organization of software and firmware associated with the generalized architecture of FIG. 1.

Turning to now FIG. 4, more detail is given of a generalized organization of software and firmware (3101) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java™ scripts and programs.

Often, computing platforms are also provided with a form of web browser or microbrowser (46), which may also include one or more extensions to the browser such as browser plug-ins (47).

The computing device is often provided with an operating system (40), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units.

Logical Processes of the Invention

We now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention. In general, the present invention provides the user the ability to follow this process:

1. Declare destination content area for pasting or insertion in a destination UI;
2. Enable highlighting or selecting content to automatic copy selected information and store it in memory (e.g. buffer/clipboard) for future usage, as well as to automatically insert or paste the selected information into the pre-designated destination area;
3. Switch to source UI's, and simply highlight or select the desired content portion(s) which triggers dynamic insertion/concatenation into the declared content field.
4. Receive an automatic notification that a portion of the highlighted source information is not written in the same spoken language as the desired spoken language of the destination; and
5. Define new rule or process for handling the content to be translated such that future similar situations are handled automatically according to the user's preferences.

Using the present invention, advantages over presently available methods and user interfaces are:

1. User-friendly: the invention utilizes maneuvering techniques with which users are already familiar, such as double mouse clicks, dragging to highlight, etc.;
2. Convenient: the invention provides a user a new way of selecting destination for paste operations, and offers a quicker way of copy/paste by eliminating keyboard strokes, mouse clicks, navigation and toggling between different program windows and UI's.
3. Intuitive: Users can learn or "discover" that in this new mode, content highlighting triggers copy/paste effortlessly, immediately seeing the results of the highlighting action, and proceeding to experiment with various ways of applying and exploring this invention.

4. Time-Saving: Reduces time to compile information from multiple sources by making copy-paste user interface methods much more efficient.

5. Increases productivity: By reducing fatigue and tediousness in application program user interfaces, users are allowed to produce more accurate results with less effort in less time.

Figure 5:
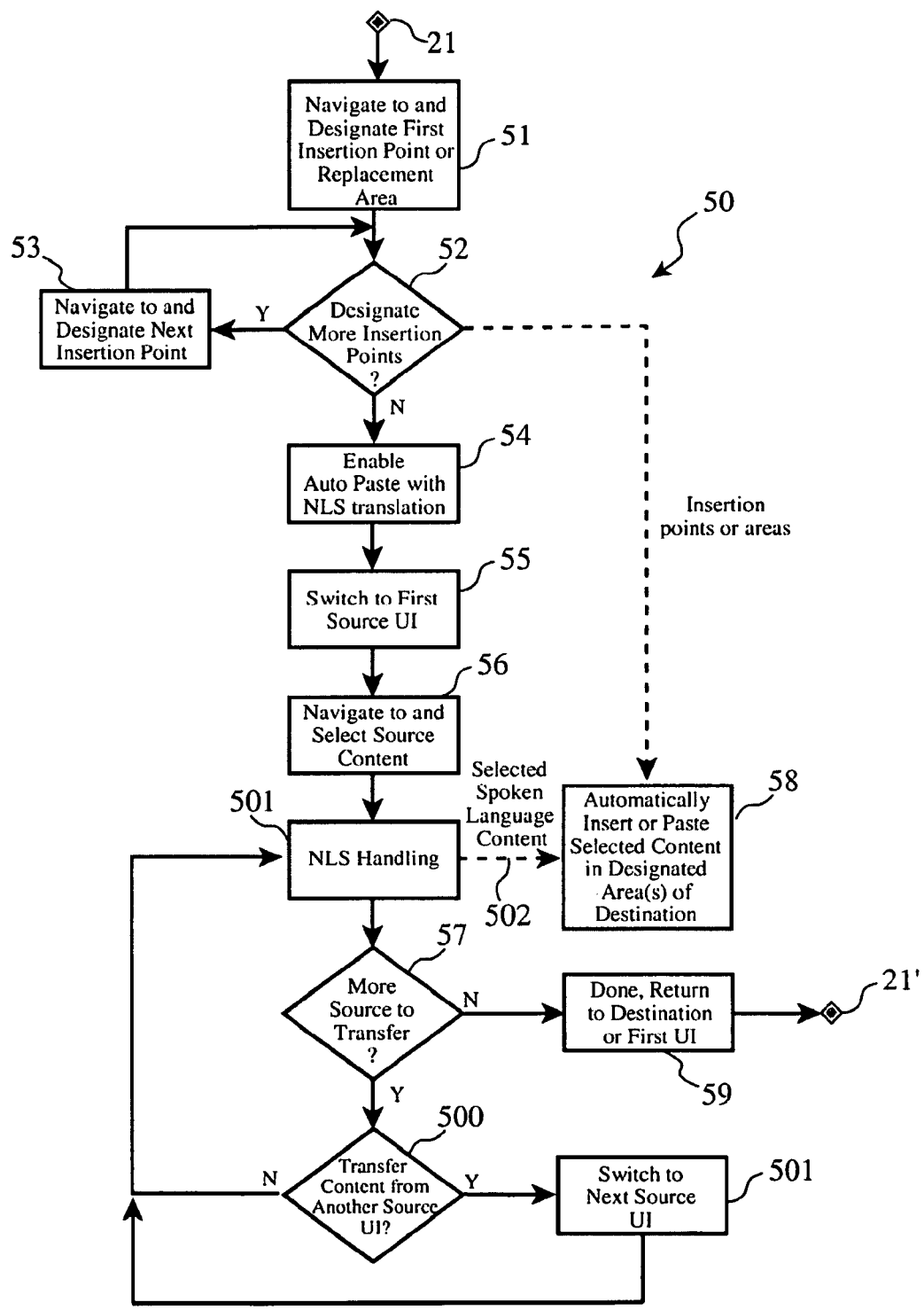
FIG. 5 illustrates the logical method of the present invention.

Turning to FIG. 5, a first logical process of the invention is shown at a high level. This method may be implemented as compiled code, scripts, or interpretable code (e.g. Java, applets, servlets, etc.) in full or part within application programs, operating systems, server suites, utility programs, or proprietary code or hardware.

While (21) creating or editing a computer resource such as a computer file or document, when a user wishes to insert or copy content from a source destination to the resource being edited, the shown method (50) may be employed. The source or sources may include points and areas within UI's of other programs and system functions, as well as within the destination resource which is being created or edited.

Initially, the user may navigate (51) to a first insertion point and optionally highlight an insertion area to designate a first "paste" destination while in the current (destination) UI. If (52) more than one insertion points or areas are desired, the user may navigate to and select (53) additional destinations while still in the destination UI. Insertion points can be marked in a variety of ways, including placement of a graphical icon such as a caret ("^") at the insertion point(s) or other suitable icon. Replacement destination areas can be marked in a variety of ways, including highlighting the selected text, graphics, information, or content in a special pattern, color, or both, or by making special changes to the selected information itself (e.g. changing the text to a different color, underlining the text, etc.). Preferably, a user interface or dialog box is also provided to allow the user to manage destination insertion points and replacement areas, such as to create additional points and areas, and to remove points and areas.

When all destination points and areas have been designated, the user enables (54) the automatic content transfer function of the invention through an appropriate user control such as right-clicking with the mouse to bring up a dialog box, selecting an option from a drop-down list, or operating a special icon, key or key sequence. According to the present invention, the user is allowed to select advanced options, such as rules for concatenation or content conversion, or whether cutting (e.g. source deletion) is performed as well as copying on each subsequent selection operation, as well as designating a spoken language for the destination(s). For example, the user may specify that the destinations which were previously designated (52) are to receive Spanish content only.

Next, the user switches (55) to the first source UI from which information is to be transferred, navigates to the first source point, and highlights or selects (56) source content.

NLS handling is performed (501), described in more detail in the following paragraphs, and the information which is expressed in the user-selected natural language is then automatically copied into the transfer buffer, and subsequently pasted (58) into the designated destination point(s) and area(s), without need to switch back to the destination UI.

If (57) more source content is to be transferred, the user may continue to navigate to additional points and to select (56) additional content for automatic pasting into the destination resource from within the current UI, or the user may switch (500, 501) to another UI and proceed with selecting (56) for automatic pasting (58) into the destination resource.

If the concatenation option is selected, upon selection of a content block or area, it is appended to the existing contents of the transfer buffer, and the user is given the option to perform the automatic pasting into the destination point(s) and area(s), without need to switch back to the destination UI.

If the source cutting operation is selected, upon selection of a content block or area, it is deleted from the source resource (assuming the user has the rights to modify the resource), placed in the transfer buffer, and pasted, concatenated or converted as determined by the other options.

When (57) all source information has been copied, the information transfer operation is complete (59), and the user returns to the initial (e.g. destination) UI to continue editing or creating (21') the computer resource.

As an example and comparison now between the user control method typically employed and the user control method provided by the present invention, we present the following case. On a MS Windows™ operating system, a user who has several windows opened intends to compose an email in Spanish using a web based mail program. Further, the user plans to generate the content of this email from his or her other open windows by using the copy/paste functions, specifically from Microsoft Word™ word processor and from Lotus Notes™ application programs.

For this example, suppose that the email message is to be created from an English paragraph in MS Word, and from a French paragraph in Lotus Notes. Also, presume that the online phrase translator BabelFish by AltaVista is to be used to provide the English to Spanish and the French to Spanish translations. So, traditionally what the user would be required to do in order to accomplish this task in the shortest time frame is the following:

1. open the email composer window;
2. switch to the window for MS Word using Alt-Tab;
3. highlight the desired English text in the MS Word document;
4. hit Ctrl-C to copy the selected text into the clipboard;
5. hit Alt-Tab until toggle to the BabelFish translator program window;
6. click on the text area or entry point wherein the source language paragraph is to be entered;
7. select English-to-Spanish as translator function;
8. highlight the produced Spanish translation in the translator UI;
9. hit Ctrl-C to copy the selected Spanish text into the clipboard;
10. hit Alt-Tab until toggle to the email composer window;
11. click on the text area or point where the translated paragraph is to be placed;
12. hit Ctrl-V or select Edit-Paste to insert the Spanish text copied from MS Word and translated by the BabelFish web service;
13. switch to the Lotus Notes window using Alt-Tab;
14. highlight or select the desired French text in Notes;
15. hit Ctrl-C to copy the text to the clipboard;
16. hit Alt-Tab until toggle to the BabelFish translator program window;
17. click on the text area or entry point wherein the source language paragraph is to be entered;
18. select French-to-Spanish as translator function;
19. highlight the produced Spanish translation in the translator UI;
20. hit Ctrl-C to copy the selected Spanish text into the clipboard;
21. hit Alt-Tab to switch back to the email composer window;

22. place the cursor on the end of the first inserted paragraph; and
23. hit Ctrl-V or select Edit-Paste with the mouse or keyboard to append the Spanish text from the Notes window (and translated by BabelFish) to the initially inserted Spanish content.

As this illustration shows, just combining two pieces of information from two sources into one destination and performing translations on the information can take 23 user steps or more using the existing processes.

Using our invention, however, this process is shortened significantly to achieve identical result without ever having to touch the keyboard:

1. open the email composer window, place cursor at desired insertion point;
2. enable auto-pasting and designate an insertion point or replacement area (e.g. by right clicking in the email text area or by double clicking on the left mouse button while in the email message text area), selecting an auto-paste option (assume no concatenation, no conversion and cutting options are selected) and select Spanish as the desired destination spoken language;
3. switch to the MS Word window using Alt-Tab;
4. highlight the first block of desired English text causing the selected text to be automatically translated to Spanish and inserted in the email composer window at the designated destination point;
5. switch to the Lotus Notes window using Alt-Tab;
6. highlight the block desired French text causing the selected text to be automatically translated to Spanish and inserted in the email composer window following the first block; and
7. switch back to the email composer window using Alt-Tab.

There are alternative implementations available to declare destination context area. For example, consider the situation where the email message is created from many windows or many sections of a few windows, the number of toggles between program windows and highlighting/Ctrl-C/Ctrl-V operations could cause intense frustration and stress on the user. In systems running operating system which are not completely stable, such window or frame switching may also increase the possibility of an OS lock up or crash.

Similar to the email example, this invention can be used by helpdesk agents filling out problem descriptions from known issues or solutions, users completing a form based on known information (creating resume, registration, etc.), and even programmer and software testers attempting to write new code or test cases by using a template or reusing available code.

There are plentiful situations where an efficient way of copying content and inserting it into one or more desired locations can significantly improve productivity, save time, reduce overall operational cost, and radically increase user satisfaction.

In an alternate embodiment of the present invention, each selection of source content may be followed by addition of a specified delimiter between the next selection of source content. For example, in the email composition scenario previously discussed, a delimiter such as a space, carriage return, HTML horizontal line, or text note may be automatically added between the MS Word paragraph and the Lotus Notes paragraph. In a first advanced implementation of this option, a descriptive annotation may be appended before or after the content, such as:

<copied from MS Word: c:\my_files\document.doc, translated from English to Spanish> and:

<copied from Lotus Notes: e:\network_backups\advice.lwp, translated from French to Spanish>

These notations can include web site addresses, as well, and optionally time and date information:

<copied from www.help.ibm.com\laptops\upgrades on 3-15-2003>

Alternate embodiments of this notation include, but are not limited to, annotations made in eXtensible Markup Language ("XML"), and possibly including a time stamp such as a local clock and calendar value, or a Coordinated Universal Time ("UTC") value.

According to another alternative aspect of the present invention, the destination areas and points may be saved in association with a computer resource (e.g. a specific file), or as a named template. These insertion points and areas can then be recalled so that new information from multiple sources can be quickly and routinely compiled. This function is particularly useful for creating news letters, status reports, and the like.

As will be recognized by those skilled in the art, the use of text as the content copied from a source to a destination in the foregoing examples is not meant to imply that the present invention is limited to such content types. In fact, it may be used to transfer content of any format which is compatible with the transfer buffer implementation. For example, video clips, graphics, hyperlinks, audio clips, and the like may be handled by the invention provided that the transfer buffer is implemented in a manner compatible with storing such information. According to one optional implementation detail, the user may define a NLS handling rule which isolates certain types of content for later review, such as a isolating pictures for later review to see if they should be exchanged for alternate pictures more suitable for the destination language and culture.

Another desirable but not critical aspect of the invention is to provide an "undo" function, with or without an action log. By keeping track of the source to destination transfers, and especially the source deletions when "cutting" is selected, the user may reverse any operation previously made. The tracking record of actions taken can preferably be produced in a human readable form, which is useful in version tracking, revision control, and similar activities.

NLS Handling

Figure 6:
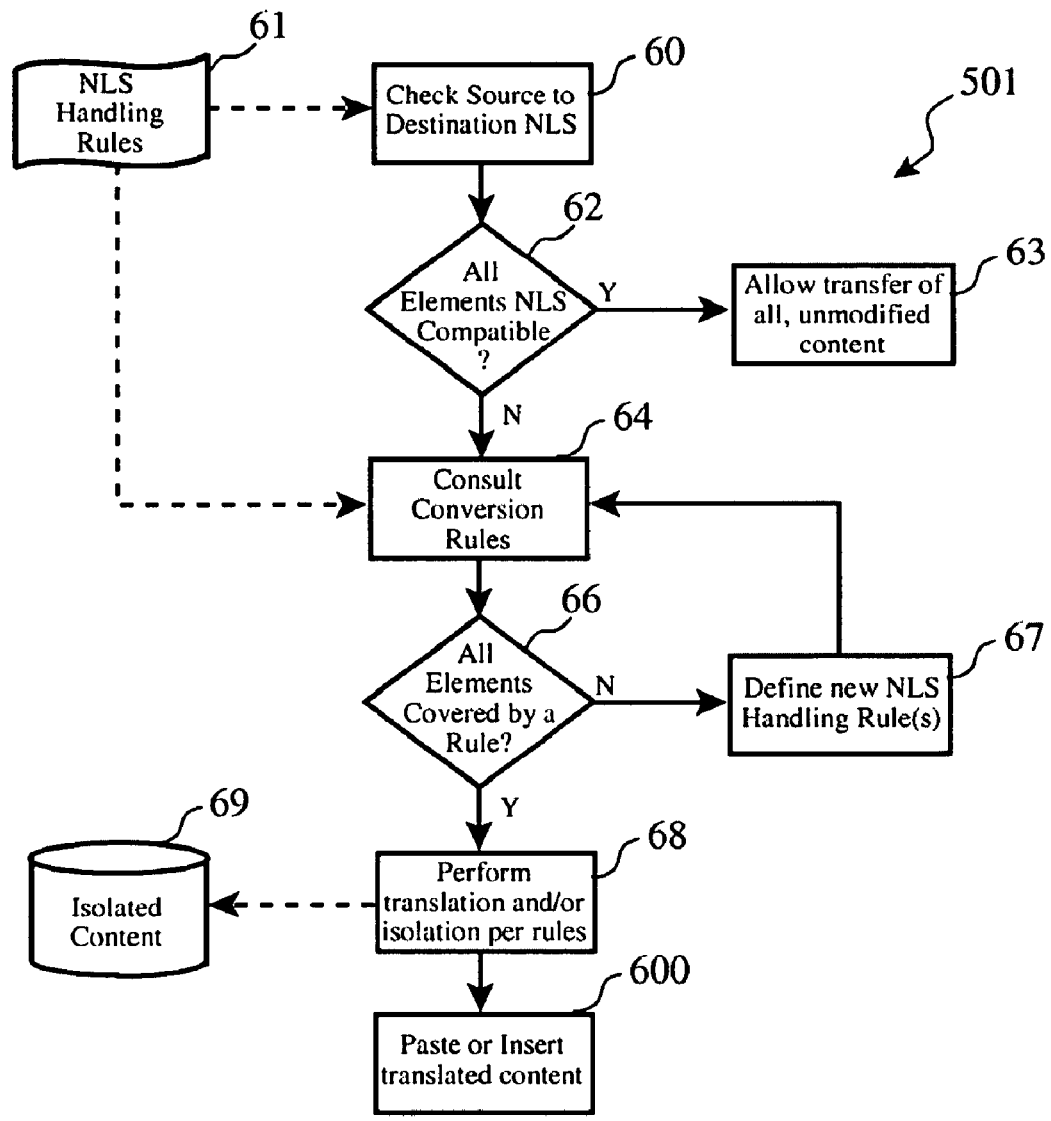
FIG. 6 depicts details of the logical process of translating transferred elements of information from a source NLS to a destination NLS.

Turning to FIG. 6, details of NLS handling (501) according to the present invention are shown. A set of NLS handling rules (61), if already defined, are consulted initially to determine (60) if all the elements of the selected source content are in the same spoken language as the user-select spoken language of the destination(s). Alternatively, the spoken language of the destination may be automatically determined by examining the words and phrases which may already exist in the destination, and comparing them to a dictionary to match them to a spoken language. This same method may be employed to automatically determine the spoken language of each source information element selected for transfer.

For example, Table 1 shows a basic set of NLS handling rules which can be implemented in a text file for a particular hypothetical destination document editor called "JotPro". Additionally, assume a hypothetical translator program or service called "QuickXlate" is available to be called or invoked on supplied text strings to perform a spoken language translation.

TABLE 1

Example "JotPro" NLS Handling Rules

```
<NLS_handling_rules>
    <destination> Jotpro </destination>
    <destination_versions> all </destination_versions>
    <text_translation_rules>
        <translate_rule>
            <source_lang> English </source_lang>
            <destination_lang> Spanish </destination_lang>
            <translator> QuickXlate </translator>
        </translate_rule>
        <translate_rule>
            <source_lang> French </source_lang>
            <destination_lang> Spanish </destination_lang>
            <translator> QuickXlate </translator>
        </translate_rule>
    <text_translation_rules>
    <isolation_rules>
        <isolate_types> pcx, gif, tif, tiff, jpg, jpeg </isolate_types>
    </isolation_rules>
</NLS_handling_rules>
```

Table 1 is expressed in a markup-style language, such as eXtensible Markup Language ("XML"). Other formats and language are available to implement such as set of compatibility rules, including but not limited to plain text, macro languages, tables, databases, etc. It defines that source in English or French which needs to be translated into Spanish is to be handled by the "QuickXlate" program or service, and that graphics elements of the types Microsoft Paintbrush (PCX), Graphic Interchange format (GIF), Tagged Information Format (TIF, TIFF), and Joint Photographic Experts Group (JPG, JPEG) format are to be isolated for later review by the user.

So, each element (e.g. paragraph or sentence of text, graphic image, video clip, audio clip, animation, etc.) is checked (60) against the set of NLS handling rules (61), and if an element needs to be translated, it is marked for translation. If (62) all elements are already in the desired destination spoken language, then transfer of the unmodified source content (all elements) is allowed (63).

For each element to be translated (or isolated), the translation function is performed according to the appropriate handling rule, such as invoking a translator program, DLL, web service, etc., using an application programming interface (API) call, or other suitable means to invoke an existing translator process or program.

There are a number of available protocols for invoking remote services such as a Common Object Request Broker Architecture ("CORBA"), Simple Object Access Protocol ("SOAP"), and many ways to transmit the data representing the phrase to be translated and the translated phrase such as eXtensible Markup Language ("XML") over hyper text transfer protocol ("HTTP"). Lingua Translator Service via SOAP and XML is one such online translator service. Another such service is provided by PROMT Ltd. of St. Petersburg, Russia.

If (66) no applicable rule for an element is found in the NLS handling rules (61), then a user interface is preferably invoked to allow the user to define a new rule or action for handling the elements of that type. When NLS handling rules for all incompatible elements have been found or defined, the translations performed (68).

Isolation is a special type of NLS handling which allows certain types of elements to be "separated" from the source content and stored in a separate data construct, such as a file on the system hard drive, or a file in system memory. In the context of NLS handling, some element types such as pictures, clip art, audio, music, etc., may need to be exchanged for more appropriate types according to the destination spoken language or culture. For example, a source image of the Eifel Tower in Paris may need to be exchanged for an image of Madrid if creating a document intended for viewing in Spain.

Figure 7:
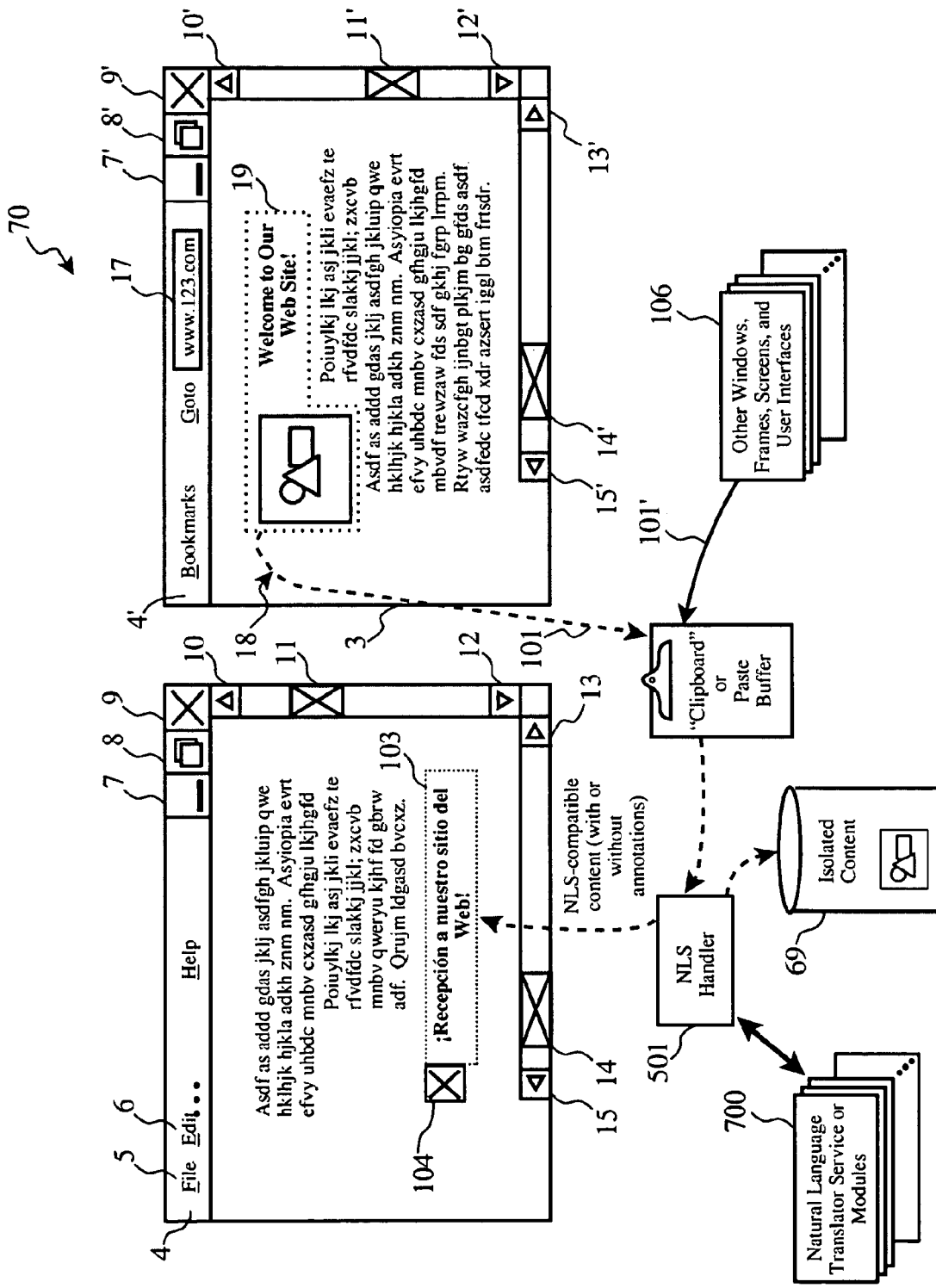
FIG. 7 provides a functional diagram illustrating the translation of information elements, and optionally the isolation of elements which are not translated.

Turning to FIG. 7, the isolation process is shown as well as the process of invoking one or more translators according to the present invention. In this example, the English text "Welcome to Our Web Site!" as well as a graphic image (shown as the circle, triangle, rectangle combination) have been selected (19) for transfer (18) from a first UI. In this example, the NLS Handler (501) has been configured to intercept the insertion of the English phrase, and to translate it to Spanish using one or more translator services (700) before inserting it into a designated point (103) in a destination UI. Additionally, in this example, the selected image is isolated to an isolated content store (69) for later review and possible exchange with a more appropriate image. Selected and copied elements from other program UI's (106) also may be automatically translated or isolated similarly.

CONCLUSION

As such, the present invention may be realized in a variety of forms, programming languages, methodologies, and operating systems on a variety of computing platforms without departure from the spirit and scope of the present invention. A number of example embodiment details have been disclosed as well as optional aspects of the present invention in order to illustrate the invention, but which do not define the scope of the invention. Therefore, the scope of the present invention should be determined by the following claims.

What is claimed is:

1. A computer memory comprising:
  a computer readable memory suitable for storage of computer programs; and
  one or more computer programs encoded by said memory and configured to perform:
    receiving a user command to enable automatic cutting-and-pasting in a destination first, source second sequence, with user enablement of automatic natural language translation;
    subsequent to receiving said command and enablement, receiving a user selection of one or more insertion points in the contents of a destination computer resource via a destination user interface, said computer resource consisting of an electronic document;
    subsequent to receiving said user-selected insertion points, receiving a user selection of one or more information elements via a source user interface;
    intercepting transfer of said information elements to said destination computer resource;
    determining which intercepted information elements are expressed in a natural language not matching a user-specified natural language;
    responsive to finding no existing natural language handling rule for an information element to be transferred:
      invoking a rule management user interface; and
      allowing via said rule management user interface a user to define an action to be taken selected from the list of invoking a natural language translation process, allowing transfer without modification, and isolating said information element;

performing one or more natural language handling actions on said intercepted information elements which do not match said user specified natural language as defined by one or more natural language handling rules; and transferring information elements to said destination which have been translated to said user specified natural language as a result of said handling actions.

2. The memory as set forth in claim 1 wherein said handling actions comprise isolating certain information elements according to said handling rules, thereby blocking their transfer to said destination.

3. The memory as set forth in claim 1 wherein said handling actions comprise determining an original natural language in which each intercepted information elements is expressed, and subsequently invoking a computer translation process to translate each item from said original natural language to said user-specified natural language.

4. A computer disk comprising:
a computer readable disk suitable for storage of computer programs; and
one or more computer programs encoded by said disk and configured to perform:
receiving a user command to enable automatic cutting-and-pasting in a destination first, source second sequence, with user enablement of automatic natural language translation;
subsequent to receiving said command and enablement, receiving a user selection of one or more insertion points in the contents of a destination computer resource via a destination user interface, said computer resource consisting of an electronic document;
subsequent to receiving said user-selected insertion points, receiving a user selection of one or more information elements via a source user interface;
intercepting transfer of said information elements to said destination computer resource;
determining which intercepted information elements are expressed in a natural language not matching a user-specified natural language;
responsive to finding no existing natural language handling rule for an information element to be transferred:
invoking a rule management user interface; and
allowing via said rule management user interface a user to define an action to be taken selected from the list of invoking a natural language translation process, allowing transfer without modification, and isolating said information element;
performing one or more natural language handling actions on said intercepted information elements which do not match said user specified natural language as defined by one or more natural language handling rules; and
transferring information elements to said destination which have been translated to said user specified natural language as a result of said handling actions.

5. The disk as set forth in claim 4 wherein said handling actions comprise isolating certain information elements according to said handling rules, thereby blocking their transfer to said destination.

6. The disk as set forth in claim 4 wherein said handling actions comprise determining an original natural language in which each intercepted information elements is expressed, and subsequently invoking a computer translation process to translate each item from said original natural language to said user-specified natural language.

7. A system comprising:
a first user interface portion of a computer configured to:
receive a user command to enable automatic cutting-and-pasting in a destination first, source second sequence, with user enablement of automatic natural language translation; and
subsequent to receiving said command and enablement, receive a user selection of one or more insertion points in the contents of a destination computer resource, said computer resource consisting of an electronic document;
a second user interface portion of said computer configured to, subsequent to receiving said user-selected insertion points, receive a user selection of one or more information elements; and
a processor configured to:
intercept transfer of said information elements to said destination computer resource;
determine which intercepted information elements are expressed in a natural language not matching a user-specified natural language;
responsive to finding no existing natural language handling rule for an information element to be transferred:
invoke a rule management user interface; and
allow via said rule management user interface a user to define an action to be taken selected from the list of invoking a natural language translation process, allowing transfer without modification, and isolating said information element;
perform one or more natural language handling actions on said intercepted information elements which do not match said user specified natural language as defined by one or more natural language handling rules; and
transfer information elements to said destination which have been translated to said user specified natural language as a result of said handling actions.

8. The system as set forth in claim 7 wherein said handling actions comprise isolating certain information elements according to said handling rules, thereby blocking their transfer to said destination.

9. The system as set forth in claim 7 wherein said handling actions comprise determining an original natural language in which each intercepted information elements is expressed, and subsequently invoking a computer translation process to translate each item from said original natural language to said user-specified natural language.

* * * * *